US011197352B2

(12) United States Patent
Xu et al.

(10) Patent No.: US 11,197,352 B2
(45) Date of Patent: *Dec. 7, 2021

(54) THAWING METHOD FOR THAWING DEVICE

(71) Applicant: HAIER SMART HOME CO., LTD., Shandong (CN)

(72) Inventors: Tong Xu, Qingdao (CN); Xiaobing Zhu, Qingdao (CN); Peng Li, Qingdao (CN); Ming Wang, Qingdao (CN); Jianbin Dai, Qingdao (CN)

(73) Assignee: HAIER SMART HOME CO., LTD., Qingdao (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,348

(22) Filed: Dec. 6, 2019

(65) Prior Publication Data
US 2020/0120765 A1    Apr. 16, 2020

Related U.S. Application Data (63) Continuation of application No. PCT/CN2018/089908, filed on Jun. 5, 2018.

(51) Int. Cl.
*H05B 6/62* (2006.01)
*A23L 3/365* (2006.01)
(Continued)

(52) U.S. Cl.
CPC .................. *H05B 6/62* (2013.01); *A23L 3/01* (2013.01); *A23L 3/36* (2013.01); *A23L 3/365* (2013.01);
(Continued)

(58) Field of Classification Search
CPC ... H05B 6/62; H05B 6/72; H05B 6/46; H05B 6/50; A23L 3/365; A23L 3/01;
(Continued)

(56) References Cited

U.S. PATENT DOCUMENTS

| 2,758,452 A * | 8/1956 | Walz ...................... F25B 40/04 |
| | | 62/127 |
| 3,976,122 A * | 8/1976 | Neidhardt ............... A23L 3/363 |
| | | 165/265 |

(Continued)

FOREIGN PATENT DOCUMENTS

| CN | 101751055 | 6/2010 |
| CN | 106288626 A | 1/2017 |

(Continued)

OTHER PUBLICATIONS

John Clayton Rawlins, CHAPTER 6—Capacitance, Editor(s): John Clayton Rawlins, Basic AC Circuits (Second Edition), Newnes, 2000, pp. 171-215, ISBN 9780750671736, https://doi.org/10.1016/B978-075067173-6/50007-9. (http://www.sciencedirect.com/science/article/pii/B9780750671736500079) (Year: 2000).*

(Continued)

*Primary Examiner* — Drew E Becker
*Assistant Examiner* — Austin Parker Taylor
(74) *Attorney, Agent, or Firm* — Alston & Bird LLP (57) ABSTRACT

A thawing method for a thawing device includes: generating a radio frequency signal; acquiring the radio frequency signal; an upper electrode plate and a lower electrode plate of the thawing chamber generating, according to the radio frequency signal, radio frequency waves having a corresponding frequency in a thawing chamber and thawing an object to be processed, obtaining voltages and currents of the incident wave signal and reflected wave signal, and determining a thawing progress of the object to be processed.

7 Claims, 8 Drawing Sheets

(51) Int. Cl.

| | | |
|---|---|---|
| *F24C 7/08* | (2006.01) | |
| *H05B 6/72* | (2006.01) | |
| *A23L 3/36* | (2006.01) | |
| *H05B 6/46* | (2006.01) | |
| *F25D 21/08* | (2006.01) | |
| *H05B 6/50* | (2006.01) | |
| *F25D 21/00* | (2006.01) | |
| *A23L 3/01* | (2006.01) | |
| *F25D 31/00* | (2006.01) | |

(52) U.S. Cl.
CPC ............. *F24C 7/087* (2013.01); *F25D 21/00* (2013.01); *F25D 21/08* (2013.01); *H05B 6/46* (2013.01); *H05B 6/50* (2013.01); *H05B 6/72* (2013.01); *F25D 31/005* (2013.01); *F25D 2400/02* (2013.01)

(58) Field of Classification Search
CPC .......... F24C 7/087; F25D 21/00; F25D 21/08; F25D 31/005; F25D 2400/02
USPC .................................................. 219/703
See application file for complete search history.

(56) References Cited

U.S. PATENT DOCUMENTS

| 4,507,530 | A | * | 3/1985 | Smith | ................... | H05B 6/6447 |
| | | | | | | 219/703 |
| 6,242,714 | B1 | * | 6/2001 | Narumiya | .............. | G01K 7/343 |
| | | | | | | 219/385 |
| 6,469,286 | B1 | * | 10/2002 | Nobue | ................... | H05B 6/705 |
| | | | | | | 219/746 |
| 2002/0047009 | A1 | | 4/2002 | Flugstad et al. | | |
| 2004/0139863 | A1 | * | 7/2004 | Boryca | ..................... | A23L 3/36 |
| | | | | | | 99/483 |
| 2008/0282714 | A1 | | 11/2008 | Cushman | | |
| 2014/0311726 | A1 | * | 10/2014 | Celik | ....................... | F25D 23/12 |
| | | | | | | 165/253 |
| 2016/0128138 | A1 | * | 5/2016 | Li | .......................... | H05B 6/705 |
| | | | | | | 219/707 |
| 2017/0055769 | A1 | * | 3/2017 | Grimaldi | .................. | H05B 6/62 |
| 2017/0127707 | A1 | * | 5/2017 | Li | .............................. | A23L 5/34 |

FOREIGN PATENT DOCUMENTS

| CN | 106387607 A | 2/2017 |
| CN | 207081265 | 3/2018 |
| CN | 207095130 | 3/2018 |
| CN | 207095160 | 3/2018 |
| JP | 2002156116 | 5/2002 |
| JP | 2004247128 | 9/2004 |
| WO | WO-2011/040715 A2 | 4/2011 |
| WO | WO 2017/065533 A1 | 4/2017 |

OTHER PUBLICATIONS

International Search Report and Written Opinion for PCT/CN2018/089908 filed Jun. 5, 2018 (8 pages).

1st Office Action the priority application No. CN 201710419633X dated Jun. 6, 2017.

1st Search Report the priority application No. CN 201710419633X dated Jun. 6, 2017.

English Translation of International Search Report and Written Opinion for PCT/CN2018/089908 (ISA/CN) dated Aug. 17, 2018 (8 pages).

English Translation of International Preliminary Report Patentability for PCT/CN2018/089908 dated Dec. 10, 2019 (6 pages).

Office Action for EP Application No. 18813059.5 dated Jun. 12, 2020 (7 pages).

Extended European Search Report for EP Application No. 18813059.5 dated May 27, 2020 (4 pages).

* cited by examiner

THAWING METHOD FOR THAWING DEVICE

This application claims priority to PCT/CN2018/089908 filed on Jun. 5, 2018 and to Chinese Appl. No. 201710419633.X filed on Jun. 6, 2017, the entire contents of which are incorporated herein by reference.

TECHNICAL FIELD

The present invention relates to the field of thawing, and particularly relates to a thawing method for a thawing device.

BACKGROUND ART

In the freezing process of food, the quality of the food is maintained, but the frozen food needs to be thawed before processing or eating. In order to facilitate a user to freeze and thaw the food, in the prior art, the food is generally thawed by disposing a heating device or a microwave device in a refrigerator.

However, it is generally takes a long time to thaw food by means of the heating device, and the thawing time and temperature are not easy to grasp, which is prone to water evaporation and juice loss of the food, resulting in quality loss of the food; and thawing food by means of the microwave device is fast and efficient, so that the nutrient loss of the food is very low, however, due to a difference in penetration and absorption of water and ice by microwaves and the uneven distribution of internal substances in the food, the melted regions absorb more energy, resulting in the problems of uneven thawing and local overheating. Under comprehensive consideration, there is a need for a thawing method for a thawing device, which has high thawing efficiency, can realize uniform thawing and can ensure the food quality.

SUMMARY OF THE INVENTION

An objective of the first aspect of the present invention is directed to provide a thawing method for a thawing device, which can determine the thawing progress of the object to be processed.

A further objective of the first aspect of the present invention is to prevent an object to be processed from being excessively thawed.

An objective of the second aspect of the present invention is to provide a thawing method for a refrigerator.

Particularly, the present invention provides a thawing method for a thawing device. The thawing device includes a cavity defining a thawing chamber configured for placement of an object to be processed and having a forward opening, a device door disposed at the forward opening of the thawing chamber and configured to open and close the thawing chamber, a radio frequency generation module, an upper electrode plate and a lower electrode plate horizontally disposed on a top wall and a bottom wall of the thawing chamber respectively and electrically connected with the radio frequency generation module respectively, and a detection module configured to detect an incident wave signal and a reflected wave signal of an electrical connection wire connecting the radio frequency generation module to the upper electrode plate. The thawing method includes:

generating, by the radio frequency generation module, a radio frequency signal;

obtaining the radio frequency signal; and generating, by the upper electrode plate and the lower electrode plate, radio frequency waves of corresponding frequency in the thawing chamber according to the radio frequency signal, and thawing the object to be processed in the thawing chamber;

obtaining a voltage and a current of the incident wave signal and a voltage and a current of the reflected wave signal; and calculating a change rate of a dielectric coefficient of the object to be processed; and determining a thawing progress of the object to be processed according to the change rate of dielectric coefficient to prevent the object from being excessively thawed.

Optionally, the step of determining the thawing progress of the object to be processed includes:

obtaining the change rate of the dielectric coefficient of the object to be processed;

determining whether the change rate of the dielectric coefficient of the object to be processed is greater than or equal to a first rate threshold; and if yes, reducing a working power of the radio frequency generation module by 30% to 40%.

Optionally, the step of determining the thawing progress of the object to be processed includes:

obtaining the change rate of the dielectric coefficient of the object to be processed;

determining whether the change rate of the dielectric coefficient of the object to be processed decreases to be less than or equal to a second rate threshold; and if yes, enabling the radio frequency generation module to stop working.

Optionally, the thawing method for a thawing device further includes:

sending a visual and/or audible signal to a user if the change rate of the dielectric coefficient of the object to be processed decreases to be less than or equal to a second rate threshold or not;

stopping sending a visual and/or audible signal to the user if the object to be processed is controllably taken out of the thawing chamber.

According to the second aspect of the present invention, a thawing method for a refrigerator is provided. The refrigerator includes a refrigerator body defining at least one containing space, at least one compartment door for opening and closing the at least one containing space separately, and a thawing device disposed in one of the at least one containing space. The thawing method includes any one of the above thawing methods for a thawing device.

Optionally, the refrigerator further includes a power supply module for supplying power for the thawing device, and a thawing switch for controlling the start and stop of a thawing program is disposed on any one of the at least one compartment door. The thawing method for a refrigerator includes:

if the thawing switch is turned on, enabling the power supply module to start to work; and if the thawing switch is turned off, enabling the power supply module to stop working.

Optionally, the thawing method for a refrigerator further includes:

if the thawing switch is turned on, the refrigeration system of the refrigerator stops providing a cooling capacity for the containing space provided with the thawing device;

if the thawing switch is turned off, the refrigeration system of the refrigerator controllably provides the cooling capacity for the containing space provided with the thawing device.

The invention determines the thawing progress of the object to be processed by the change rate of the dielectric coefficient of the object to be processed. Compared with the mode of determining the thawing progress of the object to be processed by sensing the temperature of the object to be processed in the prior art, the determining mode of the present invention is more accurate.

Further, the change rate of the dielectric coefficient of the object to be processed is calculated by the detection module to determine the thawing progress of the object to be processed. Prior to the present invention, it is generally recognized by those skilled in the art that when the temperature of the object to be processed is higher (i.e., the temperature of the object to be processed is greater than or equal to −7° C.), the thermal effect is significantly attenuated, so that the object to be processed cannot be excessively thawed. However, this is not the case. Generally, the radio frequency thawing power is larger (greater than 100 W). When the temperature of the object to be processed is higher, the object to be processed is prone to excessive thawing. The inventor of the present application has creatively recognized that when the temperature of the object to be processed is higher, the object to be processed can be effectively prevented from being excessively thawed by reducing the working power of the radio frequency generation module by 30 to 40%.

Further, whether the thawing is completed or not is determined according to the change rate of the dielectric coefficient of the object to be processed. Compared with the mode of determining whether the thawing is completed by sensing the temperature of the object to be processed in the prior art, the determining mode of the present invention is more accurate, and the object to be processed can be further prevented from being excessively thawed. Tests show that the temperature of the object to be processed, thawed by the thawing device of the present invention, is generally −4 to −2° C. when the thawing is completed, and bloody water generated by thawing when the object to be processed is meat can be avoided.

DETAILED DESCRIPTION

The invention will be described in detail below in conjunction with the specific embodiments shown in the drawings. However, the embodiments are not intended to limit the invention, and the structural, method, or functional changes made by those skilled in the art in accordance with the embodiments are included in the scope of the present invention.

Figure 1:
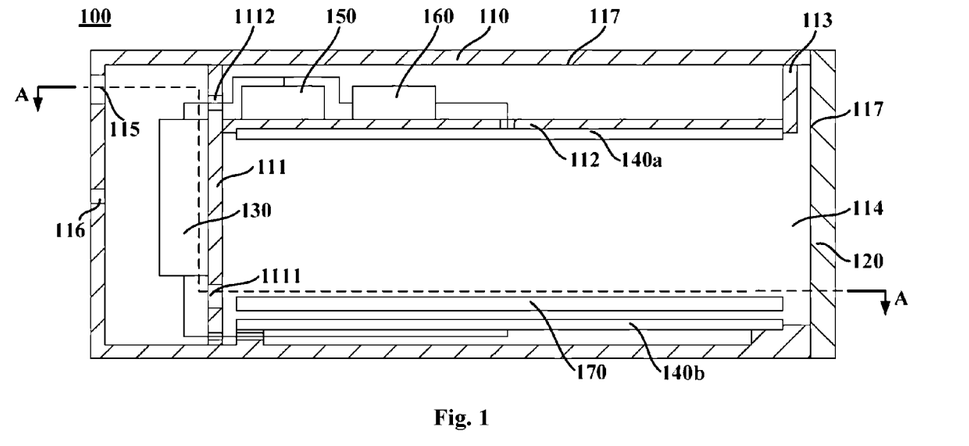
FIG. 1 is a schematic structural view of a thawing device according to an embodiment of the present invention.

FIG. 1 is a schematic structural view of a thawing device 100 according to an embodiment of the present invention. Referring to FIG. 1, the thawing device 100 may include a cavity 110, a device door 120, a radio frequency generation module 130, an upper electrode plate 140a and a lower electrode plate 140b. The cavity 110 may include a top plate, a bottom plate, a rear plate and two transverse side plates opposite to each other, a thawing chamber 114 having a forward opening may be defined therein, and the thawing chamber 114 is configured for placement of an object to be processed. The device door 120 may be disposed at the forward opening of the thawing chamber 114 and configured to open or close the thawing chamber 114. The device door 120 and the cavity 110 may be mounted together through an appropriate method, such as a left-hand door, a right-hand door and a swing-up door. The radio frequency generation module 130 may be configured to generate a radio frequency signal (generally a radio frequency signal having a frequency between 300 KHz and 300 GHz). The upper electrode plate 140a and the lower electrode plate 140b may be horizontally disposed on a top wall and a bottom wall of the thawing chamber 114 respectively and electrically connected with the radio frequency generation module 130 respectively to generate radio frequency waves of corresponding parameters in the thawing chamber 114 according to the radio frequency signal generated by the radio frequency generation module 130, and thaw the object to be processed in the thawing chamber 114. In the present invention, the upper electrode plate 140a is a transmitting antenna, and the lower electrode plate 140b is a receiving antenna. In some embodiments, the upper electrode plate 140a and the lower electrode plate 140b may be electrically connected with the radio frequency generation module 130 respectively by adopting a 50-ohm electrical connection wire.

In some embodiments, the thawing device 100 may further include a detection module 150. The detection module 150 may be configured to detect an incident wave signal and a reflected wave signal of an electrical connection wire connecting the radio frequency generation module 130 to the upper electrode plate, and calculate a load impedance of the radio frequency generation module 130 according to a voltage and a current of the incident wave signal and a voltage and a current of the reflected wave signal. The calculation formulas of the load impedance are as follows:

$$SWR = Z_2/Z_1 \quad (1)$$

$$Z_1 = U_1/I_1 = R_1 + jX_1 \quad (2)$$

$$Z_2 = U_2/I_2 = R_2 + jX_2 \quad (3)$$

In the formulas (1), (2) and (3), SWR is standing-wave ratio, $Z_1$ is output impedance, $Z_2$ is load impedance, $U_1$ is incident wave voltage; $I_1$ is incident wave current, $R_1$ is output resistance, $X_1$ is output impedance, $U_2$ is reflected wave voltage, $I_2$ is reflected wave current, $R_2$ is output resistance, and $X_2$ is load impedance. It can be understood by those skilled in the art that the output impedance is the impedance of the electrical connection wire connecting the radio frequency generation module 130 to the upper electrode plate 140a, and the load impedance is the impedance of the object to be processed.

The thawing device 100 may further include a load compensation module 160. The load compensation module 160 may include a compensation unit and a motor for adjusting a load of the compensation unit. The compensation unit may be disposed in series with the object to be processed. That is, the load impedance of the radio frequency generation module 130 is the sum of the impedance of the object to be processed and the impedance of the compensation unit. The motor may be configured to controllably increase or reduce the load of the compensation unit to increase or reduce the load impedance $Z_2$ of the radio frequency generation module 130, and enable a difference (a value obtained by subtracting the output impedance $Z_1$ from the load impedance $Z_2$) between the load impedance $Z_2$ of the radio frequency generation module 130 and the output impedance $Z_1$ of the radio frequency generation module 130 to be greater than or equal to a first impedance threshold and less than or equal to a second impedance threshold (the first impedance threshold is less than the second impedance threshold) to improve the thawing efficiency of the object to be processed. In some exemplary embodiments, the first impedance threshold is −6 to −4% of the output impedance $Z_1$, and the second impedance threshold is 4 to 6% of the output impedance $Z_1$. Further preferably, the first impedance threshold is −5% of the output impedance $Z_1$, and the second impedance threshold is 5% of the output impedance $Z_1$. In other words, the load compensation module may be configured to enable an absolute value of the difference between the load impedance $Z_2$ of the radio frequency generation module 130 and the output impedance $Z_1$ to be always less than 5% of the output impedance $Z_1$ in a whole thawing process, such as 1%, 3% or 5% of the output impedance Z1.

The detection module 150 may be configured to further calculate a dielectric coefficient of the object to be processed and a change rate of the dielectric coefficient according to the load impedance $Z_2$ of the radio frequency generation module 130. The calculation formulas of the dielectric coefficient of the object to be processed are as follows:

$$X_2 = 1/2\pi f C \tag{4}$$

$$\varepsilon = 4\pi K d C / S \tag{5}$$

In the formulas (4) and (5), f is frequency of radio frequency wave, C is capacitance of a capacitor constituted by the upper electrode plate 140a and the lower electrode plate 140b, F is dielectric coefficient of the object to be processed, K is static constant, d is thickness of the upper electrode plate, and S is area of the upper electrode plate.

Figure 4:
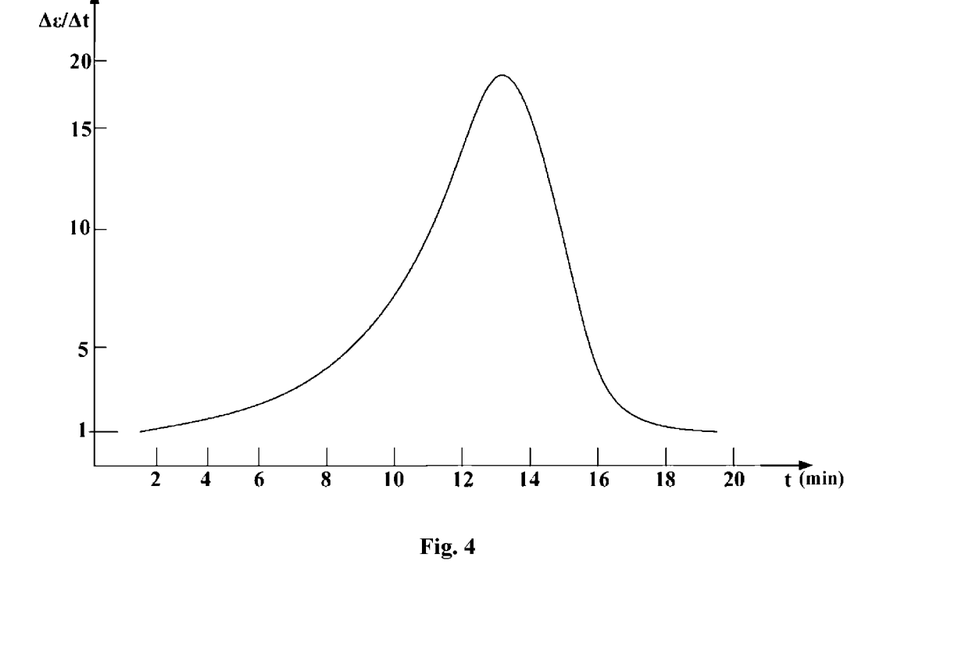
FIG. 4 is a graph showing a change rate of a dielectric coefficient of an object to be processed according to an embodiment of the present invention.

The change rate of the dielectric coefficient of the object to be processed can be obtained by calculating a change value $\Delta\varepsilon$ of the dielectric coefficient F within a unit time $\Delta t$, where the unit time $\Delta t$ may be 0.1 s to 1 s, such as 0.1 s, 0.5 s or 1 s. FIG. 4 is a graph showing a change rate of a dielectric coefficient of an object to be processed according to an embodiment of the present invention, where the longitudinal coordinate is the change rate $\Delta\varepsilon/\Delta t$ of the dielectric coefficient of the object to be processed, and the horizontal coordinate is the thawing time t (unit: min) of the object to be processed. Referring to FIG. 4, in some exemplary embodiments, the radio frequency generation module 130 may be configured as follows: when the change rate $\Delta\varepsilon/\Delta t$ of the dielectric coefficient of the object to be processed is greater than or equal to the first rate threshold, the working power of the radio frequency generation module 130 is reduced by 30% to 40%, such as 30%, 35% or 40%, thereby preventing the object to be processed from being excessively thawed. Those skilled in the art can understand that the excessive thawing means that the temperature of the object to be processed is greater than 0° C. The first preset threshold may be 15 to 20, such as 15, 17, 18 or 20. The radio frequency generation module 130 may also be configured to: stop working when the change rate $\Delta\varepsilon/\Delta t$ of the dielectric coefficient of the object to be processed decreases to be less than or equal to the second rate threshold. The second preset threshold may be 1 to 2, such as 1, 1.5 or 2. An indicator light and/or an alarm may be disposed on the device door 120 of the thawing device 100 to send a visual and/or audible signal to prompt the user to take out the object to be processed after the thawing of the object to be processed is completed. The indicator light and/or the alarm stops working when the object to be processed is taken out of the thawing chamber 114.

As the temperature of the object to be processed changes, the dielectric coefficient of the object to be processed also changes, which is well known to those skilled in the art. However, the dielectric coefficient is usually measured by a special instrument (for example, a dielectric coefficient tester), and the special instrument is large in occupied space and high in cost and is not suitable for a thawing device having a smaller size. In the present invention, the dielectric coefficient of the object to be processed is calculated by detecting the incident wave signal and the reflected wave signal of the electrical connection wire connecting the radio frequency generation module 130 to the upper electrode plate, and the radio frequency generation module 130 is small in occupied space and low in cost and is especially suitable for the thawing device.

Further, the change rate of the dielectric coefficient of the object to be processed is calculated by the detection module 150 to determine the thawing progress of the object to be processed. Prior to the present invention, it is generally recognized by those skilled in the art that when the temperature of the object to be processed is higher (i.e., the temperature of the object to be processed is greater than or equal to −7° C.), the thermal effect is significantly attenuated, so that the object to be processed cannot be excessively thawed. However, this is not the case. Generally, the radio frequency thawing power is larger (greater than 100 W). When the temperature of the object to be processed is higher, the object to be processed is prone to excessive thawing. The inventor of the present application has creatively recognized that when the temperature of the object to be processed is higher, the object to be processed can be effectively prevented from being excessively thawed by reducing the working power of the radio frequency generation module 130 by 30 to 40%. Further, whether the thawing is completed is determined according to the change rate of the dielectric coefficient of the object to be processed. Compared with the mode of determining whether the thawing is completed by sensing the temperature of the object to be processed in the prior art, the determining mode of the present invention is more accurate, and the object to be processed can be further prevented from being excessively thawed. Tests show that the temperature of the object to be processed, thawed by the thawing device of the present invention, is generally −4 to −2° C. when the thawing is completed, and bloody water generated by thawing when the object to be processed is meat can be avoided.

Figure 2:
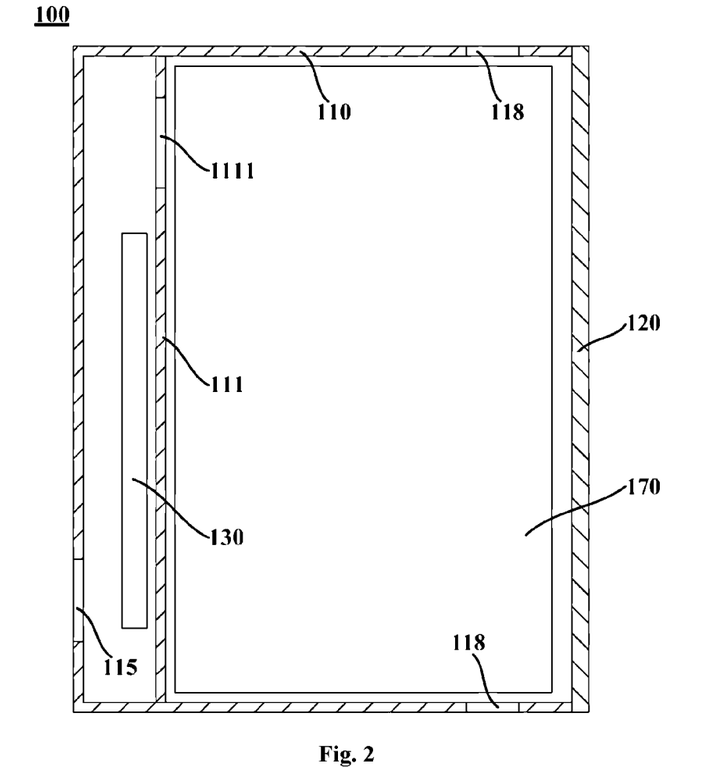
FIG. 2 is a schematic cross-sectional view taken along a section line A-A in FIG. 1.

FIG. 2 is a schematic cross-sectional view taken along a section line A-A in FIG. 1. Referring to FIG. 1 and FIG. 2, the cavity 110 may further include a vertical clapboard 111 and a horizontal clapboard 112 for defining an inner space of the cavity 110. The vertical clapboard 111 may be configured to extend from a top plate of the cavity 110 along a vertical direction to a bottom plate of the cavity 110. The radio frequency generation module 130 may be disposed between the vertical clapboard 111 and the rear plate of the cavity 110. The horizontal clapboard 112 may be configured to extend forward from the vertical clapboard 111 along a horizontal direction. The detection module 150 and the load compensation module 160 may be disposed between the horizontal clapboard 112 and the top plate of the cavity 110.

The thawing chamber 114 may be enclosed by the vertical clapboard 111, the horizontal clapboard 112 and the bottom plate and two transverse side plates of the cavity 110. The upper electrode plate 140a may be disposed on the lower surface of the horizontal clapboard 112, and the lower electrode plate 140b may be disposed on the upper surface of the bottom plate of the cavity 110. The vertical clapboard 111 may be provided with a first wire passing port 1112, so that the radio frequency generation module 130 is electrically connected with the upper electrode plate 140a through the first wire passing port 1112. The cavity 110 may further include a baffle plate 113 extending upward from a front side end of the horizontal clapboard 112 along a vertical direction to the top plate of the cavity 110, to prevent the exposure of the detection module 150 and the load compensation module 160 from affecting the aesthetics of the thawing device 100.

In some embodiments, the rear plate of the cavity 110 may be provided with a device air inlet 115, and the vertical clapboard 111 at a rear side of the thawing chamber 114 may be provided with a thawing air inlet 1111, so that the air outside the thawing device 100 enters the thawing chamber 114 of the thawing device 100 through the device air inlet 115 and the thawing air inlet 1111. Side plates at two transverse sides of the thawing chamber 114 may be provided with device air outlets 118, so that the gas in the thawing chamber 114 is discharged to the outside of the thawing device 100 through the device air outlets 118.

In some exemplary embodiments, the device air inlet 115 and the thawing air inlet 1111 of the thawing device 100 may be respectively disposed at two transverse sides of the radio frequency generation module 130 to facilitate heat dissipation of the radio frequency generation module 130. In some alternative embodiments, the device air inlet 115 and the thawing air inlet 1111 of the thawing device 100 may be disposed at the same side of the radio frequency generation module 130.

By disposing the device air inlet 115 and the device air outlet 118 on the thawing device 100, when no thawing instruction is received, the thawing chamber 114 may be configured for placement of food materials, so that the storage space in the thawing device 100 is fully utilized.

The thawing device 100 may also include a tray 170. The tray 170 is disposed in the thawing chamber 114, and the object to be processed is placed on the tray 170. The tray 170 may be configured to controllably move in a depth direction of the thawing chamber 114, so that the object to be processed can be placed and taken out. In some exemplary embodiments, a distance between the lower surface of the tray 170 and the lower electrode plate 140b may be 8 to 12 mm, such as 8 mm, 10 mm or 12 mm, thereby preventing friction between the tray 170 and the lower electrode plate 140b in a drawing process of the tray 170.

Figure 3:
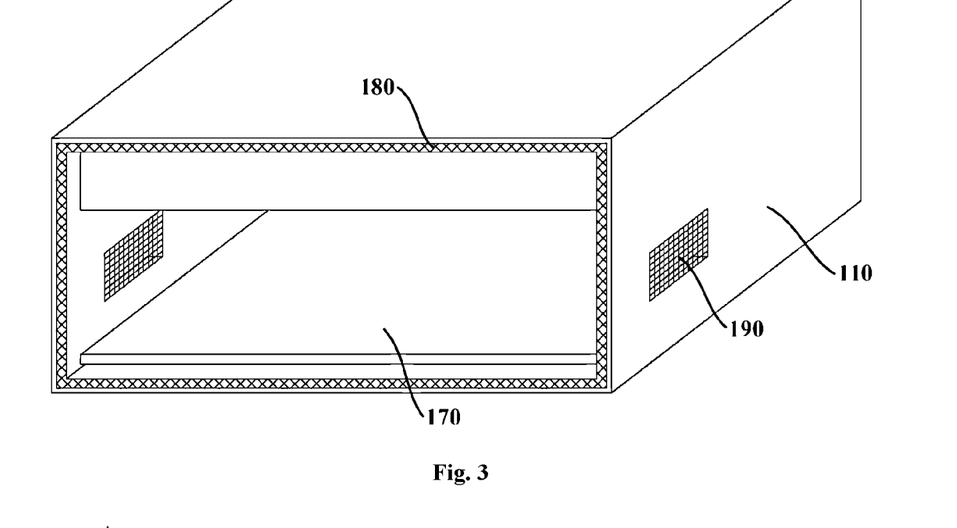
FIG. 3 is a schematic structural view of the thawing device in FIG. 1, where a device door of the thawing device is removed to show an inner structure of a cavity.

FIG. 3 is a schematic structural view of the thawing device in FIG. 1, wherein a device door of the thawing device is removed to show an inner structure of a cavity. Referring to FIG. 1 and FIG. 3, the cavity 110 and the device door 120 may be respectively provided with electromagnetic shielding features 117. The electromagnetic shielding feature 117 disposed on the cavity 110 and the electromagnetic shielding feature 117 disposed on the device door 120 may be in conductive connection, so that when the device door 120 is closed, the amount of outward magnetic leakage of the thawing device 100 is reduced. The electromagnetic shielding features 117 may be conductive coatings applied to the inner wall of the cavity 110 and the inner surface of the device door 120 (the surface facing the cavity 110), conductive metal meshes attaching to the inner wall of the cavity 110 and the inner surface of the device door 120, or conductive metal meshes formed in each of the plates enclosing the cavity 110 and in the device door 120.

In some exemplary embodiments, the thawing device 100 may further include an elastic conductive loop 180. The elastic conductive loop 180 may be disposed at the periphery of the forward opening of the thawing chamber 114 so as to generate compression deformation when the device door 120 is closed, and closely fits the device door 120. That is, a seal is formed between the elastic conductive loop 180 and the device door 120. The electromagnetic shielding feature 117 disposed on the cavity 110 and the electromagnetic shielding feature 117 disposed on the device door 120 may be respectively configured to be in conductive contact with the elastic conductive loop 180, so that when the device door 120 is closed, the amount of outward magnetic leakage of the thawing device 100 is reduced. In some exemplary embodiments, the elastic conductive loop 180 may be made of silicone, silicone fluorides, EPDM, fluorocarbon-silicone fluorides, and silver-plated aluminum. The elastic conductive loop 180 may be of a hollow ring structure, so as to closely fit the device door 120 when the device door 120 is closed. A width of the elastic conductive loop 180 may be 20 to 30 mm, such as 20 mm, 25 mm or 30 mm, thereby improving the air tightness of the thawing device 100. In some exemplary embodiments, the device air inlet 115, the thawing air inlet 1111 and the device air outlet 118 of the thawing device 100 each may be provided with a conductive metal mesh 190, and the conductive metal mesh 190 may be configured to be in conductive connection with the electromagnetic shielding feature 117 disposed on the cavity 110 to reduce the amount of magnetic leakage of the thawing device 100.

Particularly, in the present invention, the frequency of the radio frequency signal generated by the radio frequency generation module 130 (namely the electromagnetic wave for thawing the object to be processed) may be 40 to 42 MHz, such as 40 MHz, 40.48 MHz, 40.68 MHz, 41 MHz or 42 MHz, thereby reducing the thawing time of the object to be processed, improving the temperature uniformity of the object to be processed, and reducing the juice loss rate of the object to be processed. In exemplary embodiments, the frequency of the radio frequency wave may be a preset constant frequency in a range of 40.48 to 40.68 MHz, thereby further reducing the thawing time of the object to be processed, improving the temperature uniformity of the object to be processed, and reducing the juice loss rate of the object to be processed. When the frequency of the radio frequency wave is 40.68 MHz, the thawing effect is the best.

In order to further understand the present invention, the preferred implementation solutions of the present invention are described below in conjunction with specific embodiments, but the present invention is not limited thereto.

TABLE 1

|  | Embodiment 1 | Embodiment 2 | Embodiment 3 | Embodiment 4 | Embodiment 5 | Comparative example 1 | Comparative example 2 |
|---|---|---|---|---|---|---|---|
| Frequency (MHz) | 40 | 40.48 | 40.68 | 41 | 42 | 13.56 | 27.12 |

In the thawing devices 100 having the radio frequencies of Embodiments 1 to 5 and the Comparative examples 1 to 2 respectively, the power of the radio frequency waves is 100 W, and the structures and the working flows of the thawing devices 100 are the same.

The thawing effects of the thawing devices 100 having the frequencies of all embodiments and all comparative examples are tested. Test explanation: 1 kg of beef having the same shape and size and an initial temperature of −18° C. is selected and placed on the tray 170 in the thawing device 100 of each embodiment and each comparative example, and the thawing time, the temperature uniformity and the juice loss rate of each embodiment and each comparative example are respectively measured, where the thawing time is the time from the beginning of thawing to the time when the thawing device 100 determines that the thawing is completed (i.e., the radio frequency generation module stops working). Temperature uniformity: after the thawing is completed, the temperatures of four corners and a center point of the beef are respectively measured, a difference between an average value of the four corners and the temperature of the center point is calculated, and the temperature uniformity is a ratio of the difference to the average value. Juice loss rate: the weight of the beef before thawing and the weight of the beef after thawing are respectively measured, a difference between the two weights is calculated, and the juice loss rate is a ratio of the difference to the weight of the beef before thawing.

The test results of the thawing effects according to Embodiments 1 to 7 and Comparative examples 1 to 2 are as shown in a table 2.

TABLE 2

|  | Thawing time (min) | Temperature uniformity | Juice loss rate (%) |
|---|---|---|---|
| Embodiment 1 | 19 | 0.4 | 0.35 |
| Embodiment 2 | 18 | 0.4 | 0.32 |
| Embodiment 3 | 18 | 0.3 | 0.29 |
| Embodiment 4 | 19 | 0.5 | 0.35 |
| Embodiment 5 | 20 | 0.5 | 0.40 |
| Comparative example 1 | 25 | 0.6 | 0.35 |
| Comparative example 2 | 23 | 0.6 | 0.40 |

According to the test results of Embodiment 5 and Comparative example 1 in the table 2, it can be seen that in the cases that the power of the radio frequency waves is the same and the structures and the working flows of the thawing devices 100 are the same, under the same test conditions, the thawing device 100 applying the radio frequency within the range of the embodiments of the present invention has a better thawing effect than the thawing device 100 applying the radio frequency in the prior art, the thawing time is reduced by 20%, and the temperature uniformity is improved by 17%.

According to the test results of Embodiments 1 to 5 in the table 2, it can be seen that the thawing device 100 applying each embodiment of the present invention has the thawing time of 20 min or below, the temperature uniformity of 0.5 or below, and the juice loss rate of 0.40% or below. By further optimizing the frequency of the radio frequency wave (40.48 to 40.68 MHz), the thawing time of the thawing device 100 can be reduced to 18 min or below, the temperature uniformity of the thawing 100200 can be improved to 0.4 or below, and the juice loss rate of the thawing device 100 can be reduced to 0.32% or below.

Figure 5:
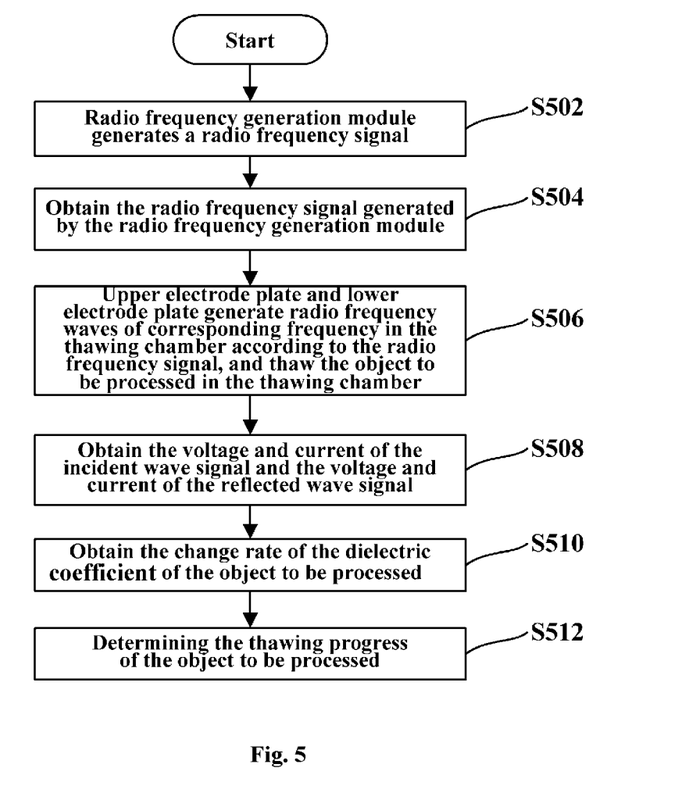
FIG. 5 is a flow chart of a thawing method for a thawing device according to an embodiment of the present invention.

FIG. 5 is a flow chart of a thawing method for a thawing device 100 according to an embodiment of the present invention. Referring to FIG. 5, the thawing method for a thawing device 10 of the present invention may include the following steps:

Step S502: Generating, by the radio frequency generation module 130, a radio frequency signal.

Step S504: Obtaining the radio frequency signal generated by the radio frequency generation module 130.

Step S506: Generating, by the upper electrode plate 140a and the lower electrode plate 140b, radio frequency waves of corresponding frequency in the thawing chamber 114 according to the radio frequency signal, and thawing the object to be processed in the thawing chamber 114.

Step S508: Obtaining the voltage and current of the incident wave signal and the voltage and current of the reflected wave signal of the electrical connection wire connecting the radio frequency generation module 130 to the upper electrode plate 140a.

Step S510: Calculating the change rate $\Delta\varepsilon/\Delta t$ of the dielectric coefficient of the object to be processed.

Step S512: Determining the thawing progress of the object to be processed.

Figure 6:
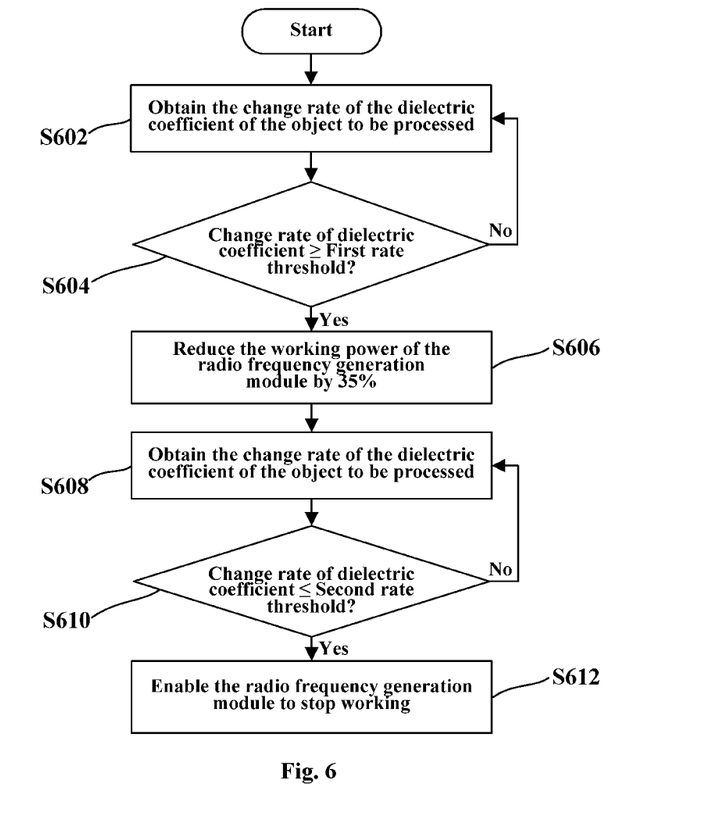
FIG. 6 is a flow chart of a method for determining the thawing progress of the object to be processed according to an embodiment of the present invention.

FIG. 6 is a flow chart of a method for determining the thawing progress of the object to be processed according to an embodiment of the present invention.

Referring to FIG. 6, the method for determining the thawing progress of the object to be processed may include the following steps: Step S602: Obtaining the change rate $\Delta\varepsilon/\Delta t$ of the dielectric coefficient of the object to be processed.

Step S604: Determining whether the change rate $\Delta\varepsilon/\Delta t$ of the dielectric coefficient of the object to be processed is greater than or equal to the first rate threshold or not; if yes, executing step S606; and if not, executing step S602.

Step S606: Reducing the working power of the radio frequency generation module 130 by 30% to 40%, where in this step, the working power of the radio frequency generation module 130 may be reduced by 35%.

Step S608: Obtaining the change rate $\Delta\varepsilon/\Delta t$ of the dielectric coefficient of the object to be processed.

Step S610: Determining whether the change rate $\Delta\varepsilon/\Delta t$ of the dielectric coefficient of the object to be processed is less than or equal to the second rate threshold or not; if yes, executing step S612; and if not, executing step S608.

Step S612: Enabling the radio frequency generation module 130 to stop working.

Figure 7:
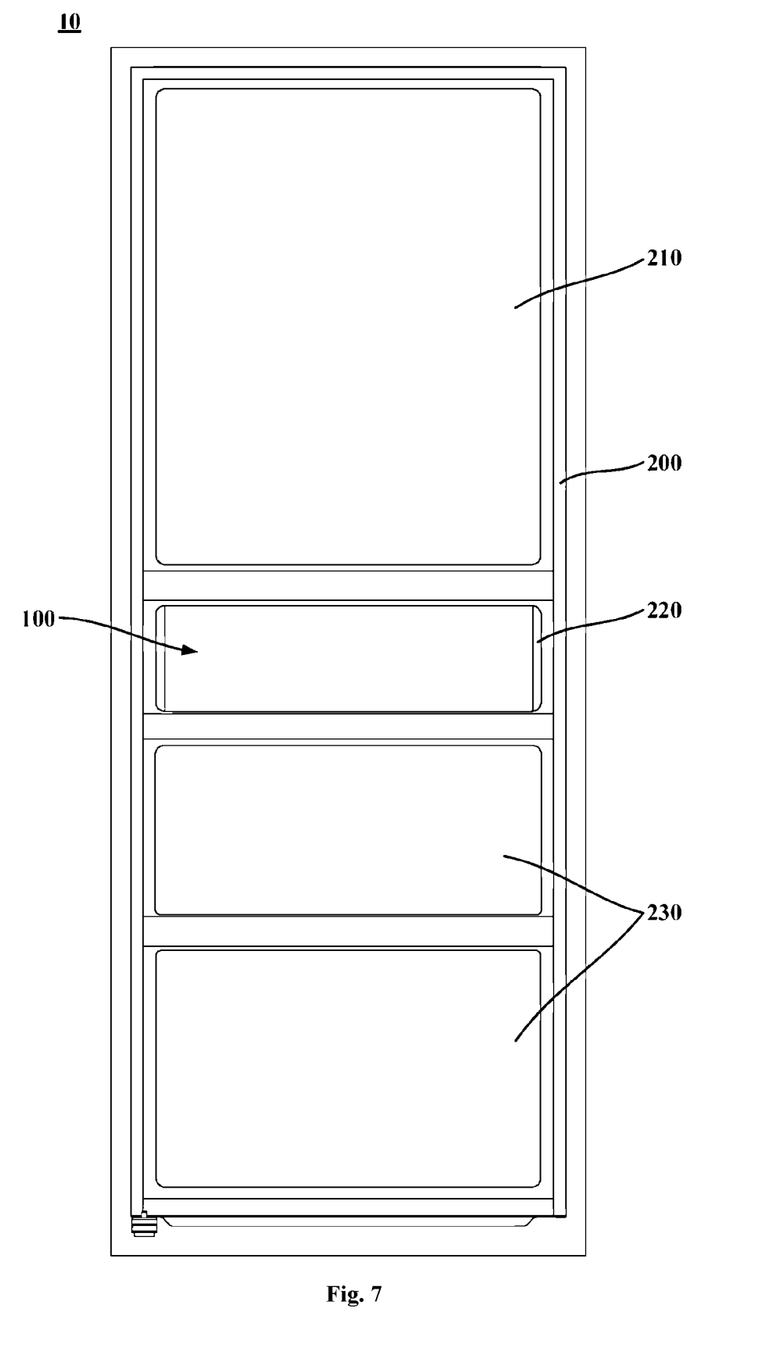
FIG. 7 is a schematic structural view of a refrigerator according to an embodiment of the present invention, where all outer doors of the refrigerator are removed to show chamber structures in the refrigerator body of the refrigerator.
Figure 8:
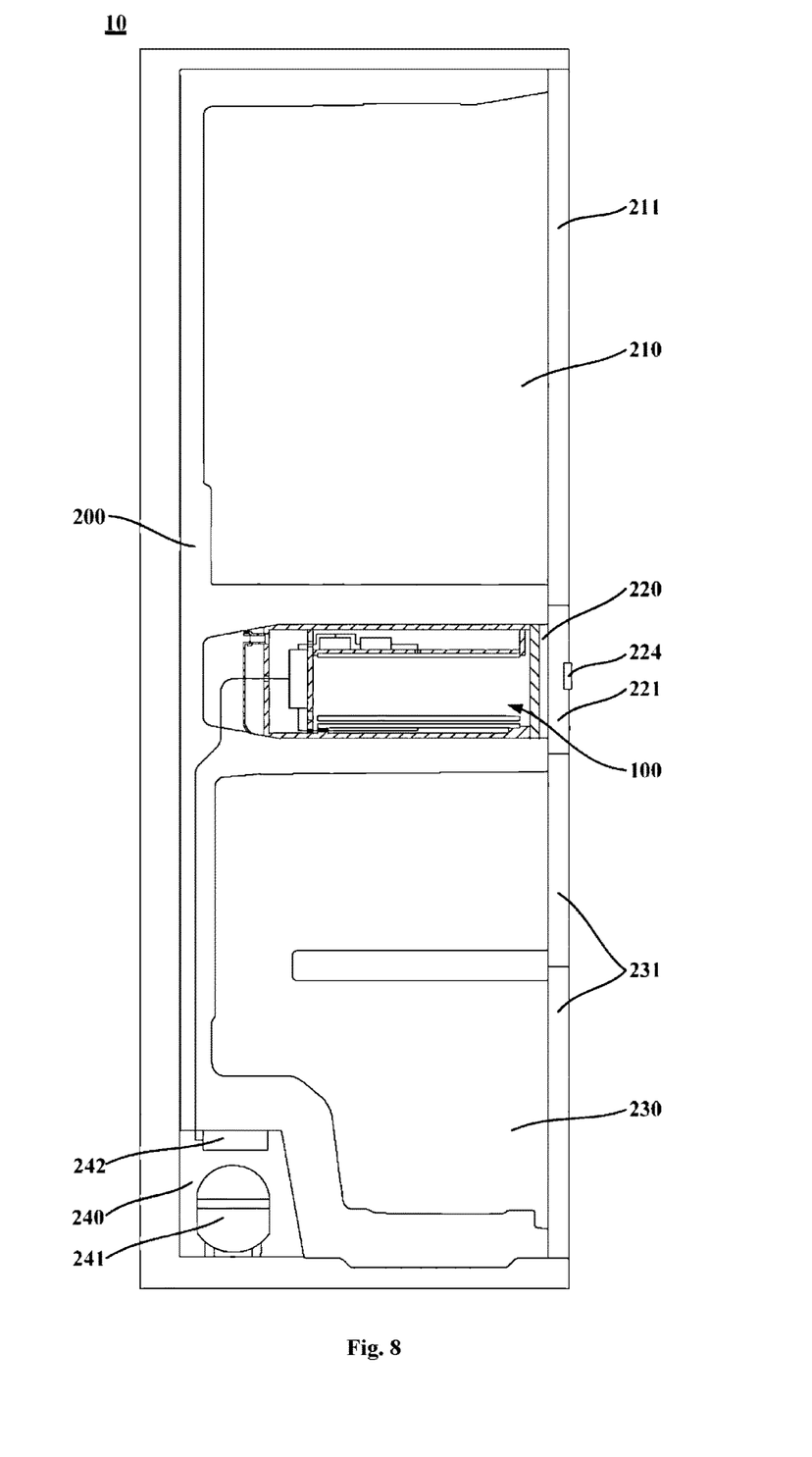
FIG. 8 is a schematic cross-sectional view of the refrigerator as shown in FIG. 7.

Based on the thawing device 100 according to any one of the above embodiments, the present invention may further provide a refrigerator 10. FIG. 7 is a schematic structural view of a refrigerator 10 according to an embodiment of the present invention, where all outer doors of the refrigerator 10 are removed to show chamber structures in a refrigerator body 200 of the refrigerator 10. FIG. 8 is a schematic cross-sectional view of the refrigerator 10 as shown in FIG. 9. Referring to FIG. 1, FIG. 7 and FIG. 8, the refrigerator 10 may generally include a refrigerator body 200 defining at least one containing space, compartment doors for respectively opening and closing an access port of each containing space, and a thawing device 100 disposed in one containing space. In the illustrated embodiment, the refrigerator 10 includes three containing spaces, namely a refrigerating chamber 210, a temperature-variable chamber 220 and a freezing chamber 230, and also includes a refrigerating door 211, a temperature-variable door 221 and a freezing door 231 for opening and closing the refrigerating chamber 210, the temperature-variable chamber 220 and the freezing chamber 230 respectively. The thawing device 100 is disposed in the temperature-variable chamber 220.

In addition, it can also be noted that as is well known to those skilled in the art, the refrigerating chamber 210 refers to a storage chamber having a storage temperature of 0 to +8° C. for food materials; the freezing chamber 230 refers to a storage chamber having a storage temperature of −20 to −15° C. for food materials; and the temperature-variable chamber 220 refers to a storage chamber capable of changing a storage temperature in a wider range (for example, the adjusting range may be 4° C. or above and the temperature may be adjusted to 0° C. or above, or 0° C. or below), and generally, the storage temperature may span refrigerating temperature, soft freezing temperature (generally −4 to 0° C.) and freezing temperature, preferably −16 to +4° C.

In some embodiments, the refrigerator 10 according to the present invention may be an air-cooled refrigerator, and the temperature-variable chamber 220 may include an air duct cover plate. The air duct cover plate and a rear inner wall of the temperature-variable chamber 220 clamp to form a temperature-variable air duct, and the air duct cover plate is provided with a temperature-variable air inlet for providing the cooling capacity for the temperature-variable chamber 220.

In some exemplary embodiments, the device air inlet 115 of the thawing device 100 may be connected with the temperature-variable air inlet through a connecting pipe so as to facilitate refrigeration of the thawing chamber 114 of the thawing device 100. In other exemplary embodiments, the projection of the device air inlet 115 of the thawing device 100 in a thickness direction of the rear plate of the cavity 110 may be in the temperature-variable air inlet so as to facilitate refrigeration of the thawing chamber 114 of the thawing device 100.

In some embodiments, a thawing switch 224 for controlling the start or stop of a thawing program may be disposed on any one of compartment doors. The radio frequency generation module 130 may be configured to: start to work when the thawing switch 224 is turned on, and stop working when the thawing switch 224 is turned off. In a thawing process, a user can terminate the thawing program by turning off the thawing switch 224. A buzzer (not shown) may also be disposed on at least one compartment door and is configured to prompt the user that the object to be processed is thawed. The buzzer may be configured to: start to work when the detection module 150 determines that the object to be processed is thawed (the change rate of the dielectric coefficient of the object to be processed decreases to be less than or equal to the second preset threshold), and stop working when the object to be processed is taken out of the thawing chamber 114. In some exemplary embodiments, the refrigeration system of the refrigerator 10 can be configured to stop providing a cooling capacity for the containing space provided with the thawing device 100 when the thawing switch 224 is turned on; when the defrosting switch 224 is turned off, the refrigeration system of the refrigerator 10 can be controlled to provide the cooling capacity for the containing space provided with the thawing device 100 (i.e., an original cooling program for operating the refrigerator 10) to reduce the influence of the refrigeration system of the refrigerator 10 on the temperature of the thawing chamber 114 when the thawing device 100 thaws the object to be processed. The refrigeration system of the refrigerator 10 may include a compressor, a condenser, a capillary, and an evaporator for providing a cooling capacity.

A distance between the thawing device 100 and the inner walls of two transverse sides of the containing space provided with the thawing device 100 may be 2 to 3 mm, such as 2 mm, 2.5 mm or 3 mm, so that the gas in the thawing chamber can be discharged to the containing space. The thawing device 100 may be fixed in the containing space by interference fit or clamping with the inner walls of two vertical sides of the containing space.

Figure 9:
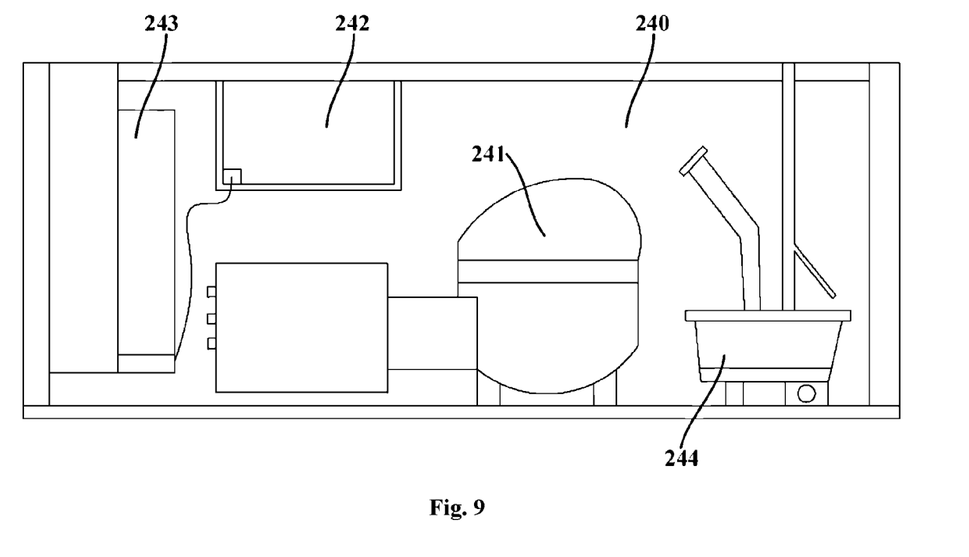
FIG. 9 is a schematic structural view of a compressor room in FIG. 8.

FIG. 9 is a schematic structural view of a compressor room 240 in FIG. 8. Referring to FIG. 9, the refrigerator body 200 of the refrigerator 10 also defines the compressor room 240. The compressor room 240 may include a main control panel 243 for controlling operation of the refrigerator 10, a compressor 241, a condensed water collecting structure 244 and an external power wire (not shown) for supplying power for operation of the refrigerator 10, which are sequentially disposed. In some embodiments, the refrigerator 10 may also include a power supply module 242 for supplying power for the radio frequency generation module 130. The power supply module 242 may be disposed in the compressor room 240 of the refrigerator 10 to facilitate heat dissipation and maintenance of the power supply module 242. The rear plate of the cavity 110 may be provided with a second wire passing port 116, so that the power supply module 242 is electrically connected with the radio frequency generation module 130 through the second wire passing port 116. The power supply module 242 may be fixed on an upper wall of the compressor room 240 to facilitate electrical connection between the radio frequency generation module 130 and the power supply module 242. The power supply module 242 may be an ACDC converter. The ACDC converter may be electrically connected with the main control panel 243 to supply power for the radio frequency generation module 130. The ACDC converter may be disposed between the main control panel 243 and the compressor 241 to make the electrical connection between the power supply module 242 and the main control panel 243 more convenient. It can be understood by those skilled in the art that it is easy to connect each component of the thawing device 100 with the control circuit of the refrigerator 10.

Figure 10:
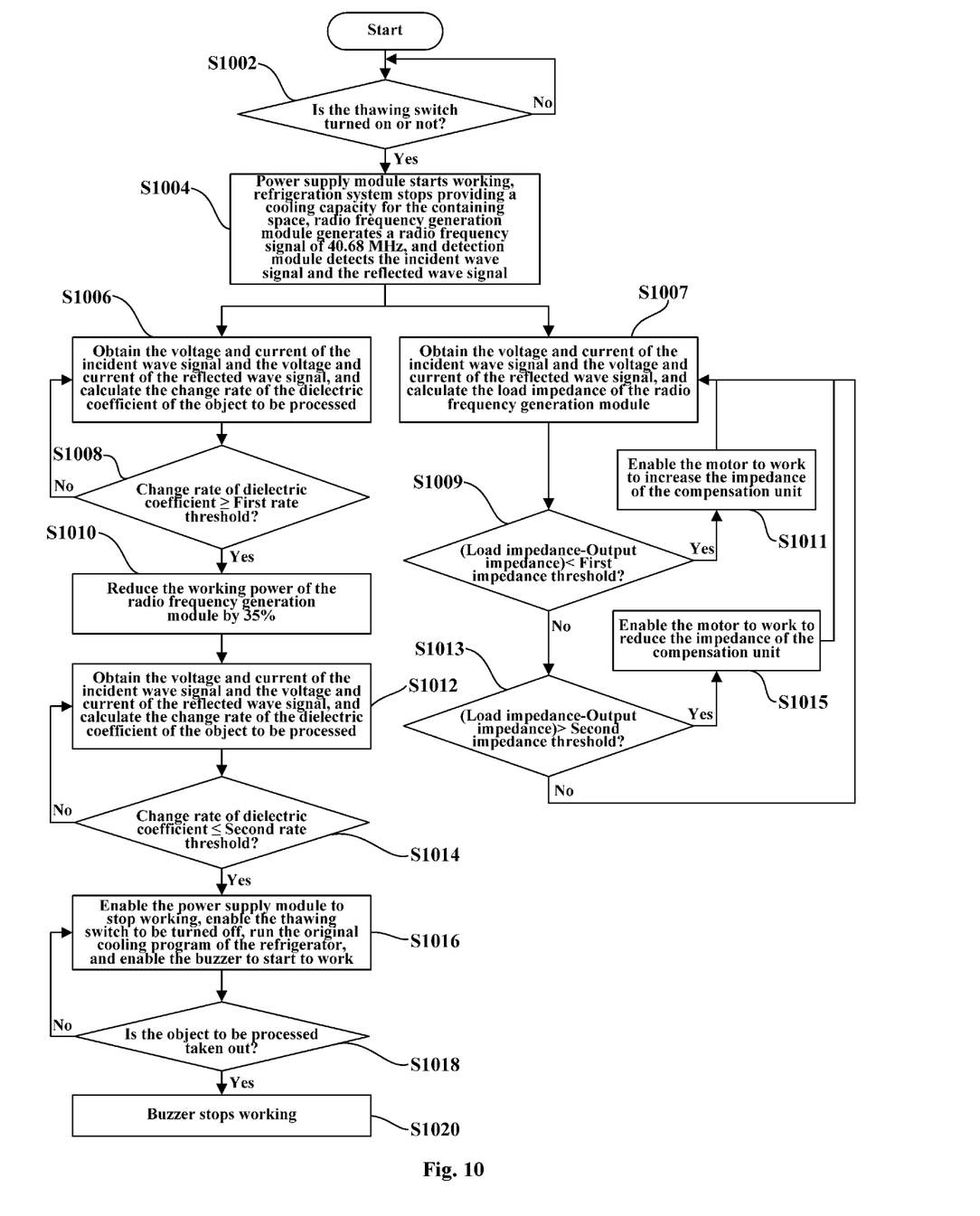
FIG. 10 is a detailed flow chart of a thawing method for a refrigerator according to an embodiment of the present invention.

FIG. 10 is a detailed flow chart of a thawing method for a refrigerator 10 according to an embodiment of the present invention. Referring to FIG. 10, the thawing method for the refrigerator 10 may include the following steps:

Step S1002: Determining whether the thawing switch 224 is turned on or not; if yes, executing step S1004; and if not, executing step S1002.

Step S1004: enabling the power supply module 242 to start to work, enabling the refrigeration system to stop providing a cooling capacity for the containing space provided with the thawing device 100, generating a radio frequency signal of 40 to 42 MHz by the radio frequency generation module 130, and detecting, by the detection module 150, an incident wave signal and a reflected wave signal of an electrical connection wire connecting the radio frequency generation module 130 with the upper electrode plate 140a, where in this step, the radio frequency generation module 130 generates a radio frequency signal of 40.68 MHz.

Step S1006: Obtaining the voltage and current of the incident wave signal and the voltage and current of the reflected wave signal, and calculating the change rate $\Delta\varepsilon/\Delta t$ of the dielectric coefficient of the object to be processed.

Step S1008: Determining whether the change rate $\Delta\varepsilon/\Delta t$ of the dielectric coefficient of the object to be processed is greater than or equal to the first rate threshold or not; if the change rate $\Delta\varepsilon/\Delta t$ is greater than or equal to the first rate threshold, executing step S1010; and if the change rate $\Delta\varepsilon/\Delta t$ is not greater than or equal to the first rate threshold, executing step S1006.

Step S1010: Reducing the working power of the radio frequency generation module 130 by 30% to 40%, where in this step, the working power of the radio frequency generation module 130 may be reduced by 35%.

Step S1012: Obtaining the voltage and current of the incident wave signal and the voltage and current of the reflected wave signal, and calculating the change rate $\Delta\varepsilon/\Delta t$ of the dielectric coefficient of the object to be processed.

Step S1014: Determining whether the change rate $\Delta\varepsilon/\Delta t$ of the dielectric coefficient of the object to be processed is less than or equal to the second rate threshold or not; if the change rate $\Delta\varepsilon/\Delta t$ is less than or equal to the second rate threshold, executing step S1016; and if the change rate $\Delta\varepsilon/\Delta t$ is not less than or equal to the second rate threshold, executing step S1012.

Step S1016: Enabling the power supply module 242 to stop working, enabling the thawing switch 224 to be reset (turned off), enabling the original cooling program of the refrigerator 10 to work, and enabling the buzzer to start to work.

Step S1018: Determining whether the object to be processed is taken out of the thawing chamber 114 or not; if yes, executing step S1020; and if not, executing step S1016.

Step S1020: Enabling the buzzer to stop working.

The thawing method further include the following steps after the step S1004: Step S1007: Obtaining the voltage and current of the incident wave signal and the voltage and current of the reflected wave signal, and calculating the load impedance $Z_2$ of the radio frequency generation module 130.

Step S1009: Determining whether the difference between the load impedance $Z_2$ of the radio frequency generation module 130 and the output impedance $Z_1$ of the radio frequency generation module is less than the first impedance threshold or not; if yes, executing step S1011; and if not, executing step S1013.

Step S1011: Enabling the motor of the load compensation module 160 to work to increase the impedance of the compensation unit, and then, returning to step S1007.

Step S1013: Determining whether the difference between the load impedance $Z_2$ of the radio frequency generation module 130 and the output impedance $Z_1$ of the radio frequency generation module is greater than the second impedance threshold or not; if yes, executing step S1015; and if not, executing step S1007.

Step S1015: Enabling the motor of the load compensation module 160 to work to reduce the impedance of the compensation unit, and then, returning to step S1007. (It can be understood by those skilled in the art that when a program runs to step S1016, the power supply module 242 stops working, i.e., stops supplying power; and the radio frequency generation module 130, the detection module 150 and the load compensation module 160 stop working. That is, when the change rate $\Delta\varepsilon/\Delta t$ of the dielectric coefficient of the object to be processed decreases to be less than or equal to the second rate threshold, the detection module 150 stops detecting the incident wave signal and the reflected wave signal of the electrical connection wire connecting the radio frequency generation module 130 to the upper electrode plate 140a, and the load compensation module 160 stops working.)

A thawing working flow of a refrigerator 10 according to an embodiment of the present invention may include: when a user turns on the thawing switch 224, the power supply module 242 starts to supply power, the refrigeration system stops providing a cooling capacity for the containing space provided with the thawing device 100, the radio frequency generation module 130 generates a radio frequency signal of 40.68 MHz, and the detection module 150 and the load compensation module 160 start to work. The detection module 150 detects the incident wave signal and the reflected wave signal of the electrical connection wire connecting the radio frequency generation module 130 to the upper electrode plate, and calculates the load impedance $Z_2$ of the radio frequency generation module 130 and the change rate $\Delta\varepsilon/\Delta t$ of the dielectric coefficient. When the change rate $\Delta\varepsilon/\Delta t$ of the dielectric coefficient of the object to be processed is greater than or equal to the first rate threshold, the working power of the radio frequency generation module 130 is reduced by 35%. Furthermore, in the whole thawing working flow, when the difference between the load impedance $Z_2$ of the radio frequency generation module 130 and the output impedance $Z_1$ of the radio frequency generation module 130 is less than the first impedance threshold or greater than the second impedance threshold, the load compensation module 160 adjusts the impedance of the compensation unit through the motor so as to adjust the load impedance $Z_2$ of the radio frequency generation module 130, so that the difference between the load impedance $Z_2$ of the radio frequency generation module 130 and the output impedance $Z_1$ of the radio frequency generation module is always greater than or equal to the first impedance threshold and less than or equal to the second preset threshold. When the change rate $\Delta\varepsilon/\Delta t$ of the dielectric coefficient of the object to be processed is less than or equal to the second rate threshold, the power supply module 242 stops supplying power, the original cooling program of the refrigerator 10 starts working, the radio frequency generation module 130, the detection module 150 and the load compensation module 160 stop working, and the buzzer starts to work. When the user takes the object to be processed out of the thawing chamber 114, the buzzer stops working.

The detailed descriptions set forth above are merely illustrative of the possible embodiments of the present invention, and are not intended to limit the scope of the present invention. Equivalent embodiments or modifications that do not depart from the spirit of the invention are intended to be included within the scope of the invention.

What is claimed is:

1. A thawing method for a thawing device, wherein the thawing device comprises a cavity defining a thawing chamber configured for placement of an object to be processed and having a forward opening, a device door disposed at the forward opening of the thawing chamber and configured to open and close the thawing chamber, a radio frequency generation module, an upper electrode plate and a lower electrode plate horizontally disposed on a top wall and a bottom wall of the thawing chamber respectively and electrically connected with the radio frequency generation module respectively, and a detection module configured to detect an incident wave signal and a reflected wave signal of an electrical connection wire connecting the radio frequency generation module to the upper electrode plate; the thawing method comprises:

generating a radio frequency signal by the radio frequency generation module;

obtaining the radio frequency signal; and generating, by the upper electrode plate and the lower electrode plate, radio frequency waves of corresponding frequency in the thawing chamber according to the radio frequency signal, and thawing the object to be processed in the thawing chamber;

obtaining a voltage and a current of the incident wave signal and a voltage and a current of the reflected wave signal; and calculating a change rate of a dielectric coefficient of the object to be processed; and determining a thawing progress of the object to be processed according to the change rate of dielectric coefficient to prevent the object from being excessively thawed.

2. The thawing method for a thawing device according to claim 1, wherein the step of determining the thawing progress of the object to be processed comprises:

obtaining the change rate of the dielectric coefficient of the object to be processed;

determining whether the change rate of the dielectric coefficient of the object to be processed is greater than or equal to a first rate threshold or not; and if yes, reducing a working power of the radio frequency generation module by 30% to 40%.

3. The thawing method for a thawing device according to claim 1, wherein the step of determining the thawing progress of the object to be processed comprises:

obtaining the change rate of the dielectric coefficient of the object to be processed;

determining whether the change rate of the dielectric coefficient of the object to be processed decreases to be less than or equal to a second rate threshold or not; and if the change rate decreases to be less than or equal to the second rate threshold, enabling the radio frequency generation module to stop working.

4. The thawing method for a thawing device according to claim 3, further comprises:

sending a visual and/or audible signal to a user if the change rate of the dielectric coefficient of the object to be processed decreases to be less than or equal to a second rate threshold;

stopping sending of the visual and/or audible signal to the user if the object to be processed is controllably taken out of the thawing chamber.

5. A thawing method for a refrigerator, wherein the refrigerator comprises a refrigerator body defining at least one containing space, at least one compartment door for opening and closing the at least one containing space separately, and a thawing device disposed in one of the at least one containing space; the thawing method comprises the thawing method for a thawing device according to claim 1.

6. The thawing method for a refrigerator according to claim 5, wherein the refrigerator further comprises a power supply module for supplying power for the thawing device, and a thawing switch for controlling the start and stop of a thawing program is disposed on any one of the at least one compartment door; the thawing method for a refrigerator comprises:

if the thawing switch is turned on, enabling the power supply module to start to work; and if the thawing switch is turned off, enabling the power supply module to stop working.

7. The thawing method for a refrigerator according to claim 6, further comprises:

if the thawing switch is turned on, the refrigeration system of the refrigerator stops providing a cooling capacity for the containing space provided with the thawing device;

if the thawing switch is turned off, the refrigeration system of the refrigerator can be controlled to provide the cooling capacity for the containing space provided with the thawing device.

* * * * *

UNITED STATES PATENT AND TRADEMARK OFFICE
CERTIFICATE OF CORRECTION

PATENT NO. : 11,197,352 B2
APPLICATION NO. : 16/706348
DATED : December 7, 2021
INVENTOR(S) : Xu et al.

It is certified that error appears in the above-identified patent and that said Letters Patent is hereby corrected as shown below:

On the Title Page

Insert the following:
-- (30) Foreign Application Priority Data
Jun. 6, 2017 (CN) .............. 201710419633.X --.

Signed and Sealed this
Twenty-seventh Day of June, 2023

Katherine Kelly Vidal
*Director of the United States Patent and Trademark Office*